Dec. 14, 1926.
T. F. BUCK
1,610,488
INSULATED BUMPER FOR VEHICLES
Filed August 19, 1925    3 Sheets-Sheet 1
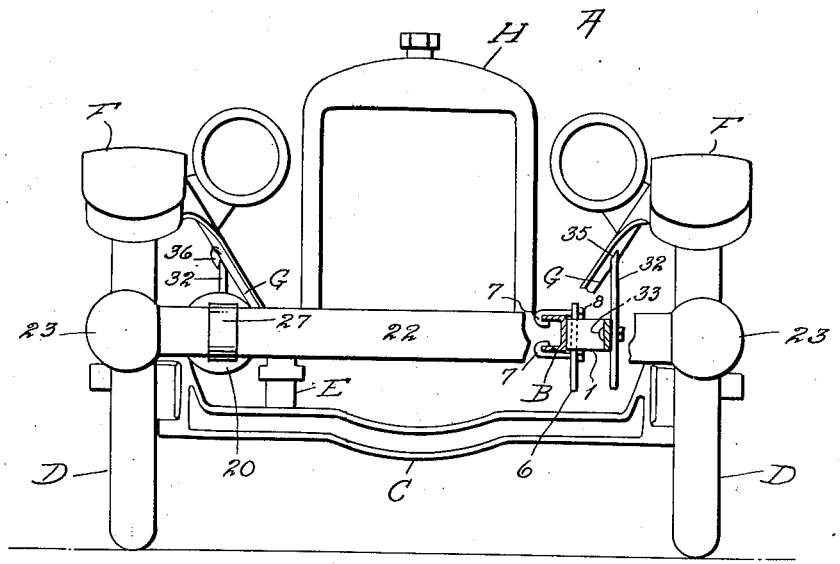
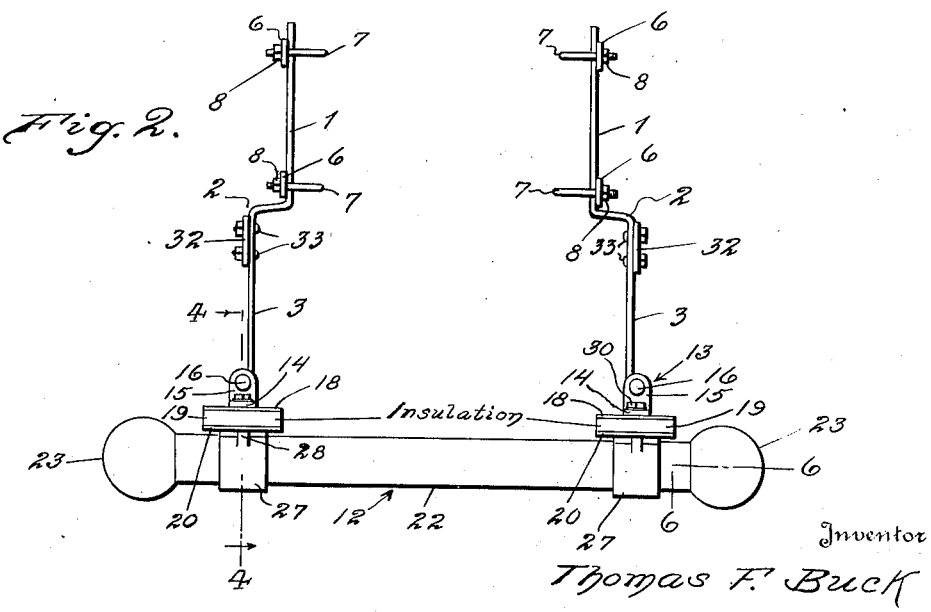

Dec. 14, 1926.
T. F. BUCK
1,610,488
INSULATED BUMPER FOR VEHICLES
Filed August 19, 1925    3 Sheets-Sheet 2
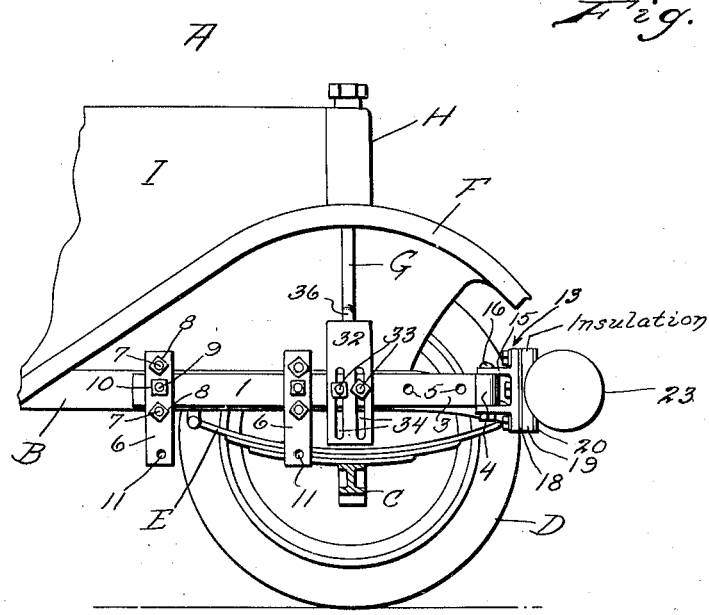
Fig. 3.
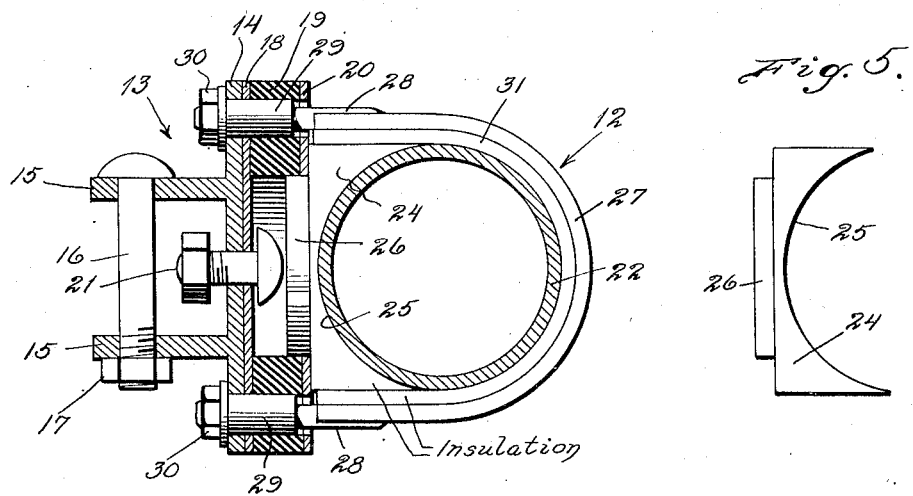
Fig. 4.
Fig. 5.
Inventor
Thomas F. Buck
By John Milton Foster
Attorney Dec. 14, 1926.                                          1,610,488
T. F. BUCK
INSULATED BUMPER FOR VEHICLES
Filed August 19, 1925        3 Sheets-Sheet 3
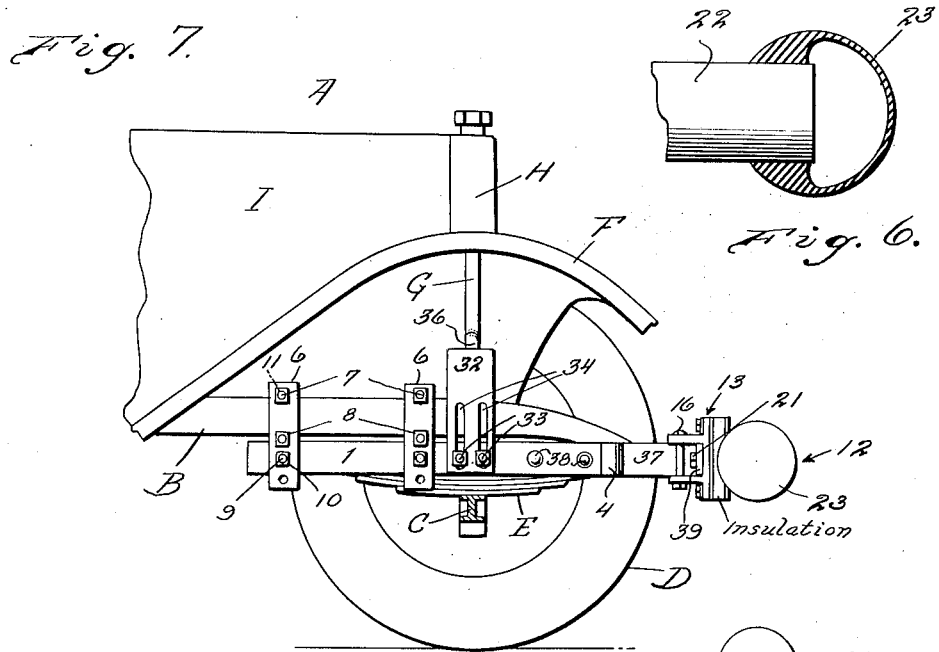
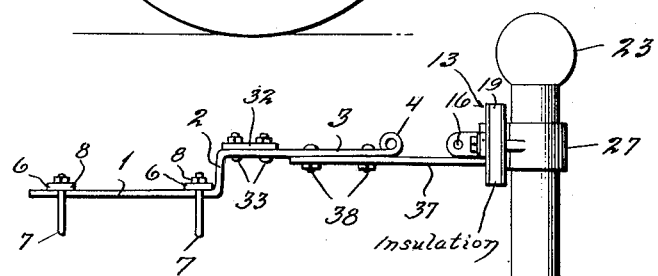
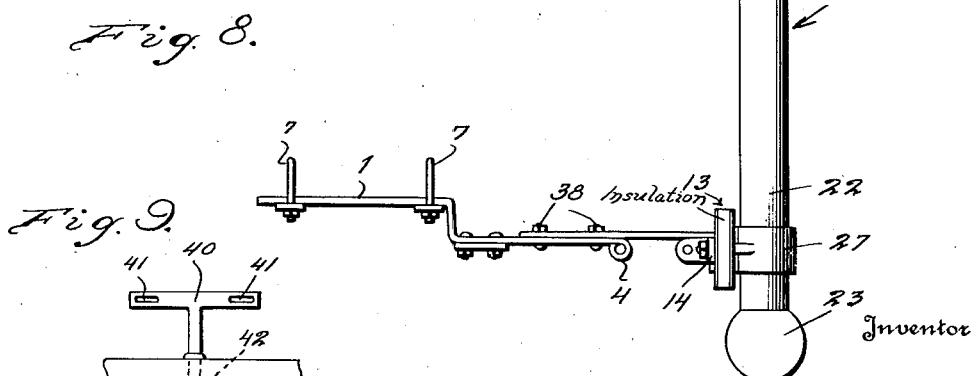

Patented Dec. 14, 1926.

1,610,488

UNITED STATES PATENT OFFICE.

THOMAS F. BUCK, OF NEW CASTLE, PENNSYLVANIA.

INSULATED BUMPER FOR VEHICLES.

Application filed August 19, 1925. Serial No. 51,145.

This invention relates to safety appliances, particularly to safety attachments for automobiles, and has for its general object the provision of a novel bumper adapted to be mounted upon the front of an automobile whereby to prevent or reduce the likelihood of injury to the front of the automobile itself in the event of a minor collision.

An important object is to provide a bumper of this character which is insulated with respect to the supporting means therefor mounted upon the vehicle frame so as to avoid injury to the operator of the vehicle and the passengers therein, should the bumper come in contact with an electrified object.

Another object of the invention is the provision of a bumper and a supporting bracket structure therefor provided with means engaging against the fender irons or braces for strengthening and reinforcing the same to prevent loosening thereof as the result of vibration and to avoid the rattling consequent to loosening, the fender bracing means being adjustable to meet various conditions and so as to render the device capable of employment upon cars of different makes.

A further object is to provide a bumper structure in which the supporting means therefor is capable of engagement upon the vehicle frame in either one of selected positions so that the height of the bumper above the ground may be varied.

Still another object is the provision of a safety device of this character in which extension means may be applied to or interposed within the supporting means for the bumper so that the position of the latter may be varied in case larger tires or wheels are used than is ordinarily the case.

Yet another object is the provision of a bumper and mounting in which either or both ends of the bumper itself may be disconnected from the supporting means to permit free access to the radiator or other forward parts of the vehicle in case any necessity arises such as, for instance, the making of repairs to the radiator or other adjacent parts.

An additional object is the provision of a bumper structure of this type which will be simple and inexpensive in manufacture, easy to install and adjust, positive in action, efficient and durable in service, and a general improvement in the art.

With the above and other objects and advantages in view, the invention consists in the details of construction and arrangement of parts to be hereinafter more fully described and claimed, and illustrated in the accompanying drawings in which:

Figure 1 is a front elevation of the device showing it mounted upon an automobile, certain parts being broken away and in section, to illustrate the construction more clearly, Figure 2 is a plan view of the bumper and its supporting means removed from the vehicle, Figure 3 is a side elevation with the forward wheel removed and the front axle in section, Figure 4 is a detail cross section taken on the line 4—4 of Figure 2, Figure 5 is a detail elevation of one of the filler blocks, Figure 6 is a detail section through one end of the bumper, the section being taken on the line 6—6 of Figure 2, Figure 7 is a view similar to Figure 3 showing the vehicle equipped with larger tires and showing a different position of the supporting means and illustrating the use of extension members in the supporting means, Figure 8 is a plan view of the bumper arranged as in Figure 7 but removed from the vehicle, and Figure 9 is a fragmentary detail view of a bumper carrying a license plate supporting bracket.

Referring more particularly to the drawings the letter A designates the front portion of an automobile including the frame bars B, and front axle C carrying the front wheels D. The letter E designates the front springs which support the frame bars, while F indicates the fenders supported by the fender irons G. The radiator and hood are designated by the letters H and I respectively. These parts of course form no part of the invention but are illustrated for the sake of clearness in explaining the mode of attachment of the device.

In carrying out the invention I provide bumper supporting means comprising a pair of arm members 1 adapted to be disposed in horizontal position against the outer sides of the frame bars B and preferably offset outwardly intermediate their ends as indicated at 2 so that the outer end portions 3 will be disposed a greater distance apart than the inner end portions. At their forward ends the portions 3 are coiled or otherwise formed to define eyes 4 for a purpose to be explained. Near their forward ends the arms are shown as formed with any desired number of holes indicated by the numeral 5, the reason for which will be hereinafter made apparent.

For securing the arms 1 in place with respect to the frame bars B, I provide upright members 6 disposed against the outer sides of the arms and having passing therethrough J-bolts 7 which are arranged one above another with their hooked ends disposed toward each other and engaging over the horizontal flanges of the channeled frame bars B as clearly illustrated in Figure 1. The J-bolts of course carry suitable nuts 8 whereby the necessary tightening action may be effected. The uprights 6 are secured to the arms 1 as by bolts 9 equipped with nuts 10, the bolts preferably having countersunk heads in order to prevent interference with the arms where they engage against the outer side of the frame bars B. In addition to the holes provided for the passage of the J-bolts 7 and bolts 9 the uprights 6 are formed with additional holes 11 so that the uprights might be mounted upon the frame bars B in a different position, as shown in Figure 7 and as will be hereinafter described.

The bumper structure, designated as a whole by the numeral 12, is of course supported from the arms 1 by means of supporting devices indicated generally by the numeral 13, two being used, identical in construction. Each of these devices 13 comprises a bracket 14 preferably of circular shape provided at its rear side with spaced ears 15 which receive between them the eye 4 at the forward end of an arm. Connection of the brackets with the eyes is effected by means of bolts 16 equipped with suitable nuts 17. Disposed against the front face of each bracket 14 is a plate 18 which forms a seat for a ring 19 of rubber or other suitable insulating material against which is in turn disposed a metal ring 20. The plate 18 is held to the bracket by means of a suitable bolt 21.

The bumper itself, designated by the numeral 22 is of elongated tubular formation with its ends preferably equipped with partially hollow spherical knob members 23 secured in place by any desired means and provided for the purpose of avoiding injury to persons or property by the sharp or square ends of the bumper bar itself. The bumper bar 22 is of course supported by the above mentioned members 13 and is insulated therefrom by means of filler blocks or saddle members 24 of rubber or other insulating material having concaved faces 25 conformingly engaged by the bumper itself and having reduced extensions 26 fitting within the openings in the ring members 19 and 20. For holding the bumper in place I provide a pair of U-shaped yokes 27 which partially embracingly engage the member 22 and which are provided at their end portions with preferably integrally formed bolts 28 which pass through insulating bushings 29 which extend through suitable registering holes in the bracket 14, plate 18, ring member 19 and ring 20. Obviously, the bolts 28 are equipped with nuts 30 whereby the yokes 27 may be drawn into clamping relation to the bumper 22 for holding it in place. It is preferable to line the yokes 27 with insulating material indicated at 31 as an additional precaution so that effective insulation of the bumper bar with respect to all the supports therefor will be insured.

Another feature of the present invention is the provision of means carried by the attachment for bracing the fender irons G so that the fenders will be held rigidly in proper position and be prevented from shaking loose and rattling. In carrying out this feature I provide upon each arm 1 a vertically adjustable plate 32 held in a selected position by means of clamping bolts 33 which are carried by the arms 1 and which pass through elongated slots 34 in the plates. The ends of these plates 32 are preferably beveled off as indicated in Figure 1 and their upper ends may be engaged either within notches 35 formed in the fender irons, as shown at the right of Figure 1, or engaged against lugs or projections 36 on the fender irons as shown at the left of Figure 1, this exact detail being immaterial. Owing to the adjustability of the plates 32 in a vertical direction, it is obvious that they may be brought easily into proper relation to the fender irons for providing adequate bracing means therefor so that a sagging fender may be held up in proper position.

It is of course apparent that the arms 1 may be adjusted longitudinally of the frame bars B to a limited extent but in case the vehicle is equipped with larger wheels or larger tires, as indicated in Figure 7, it is quite probable that the possible adjustability of the arms would be insufficient for the bumper to clear the tires. To take care of such a contingency, use may be made of inserts or extension arms 37, as illustrated in Figures 7 and 8, which inserts may be bolted onto the arms 1 by means of bolts 38 passing through the holes 5. These inserts terminate in lateral extensions 39 disposed against the rear sides of the brackets 14, between the arms 15 and secured by the bolts 21.

In case the extra large wheels or tires are used, it is probably preferable that the entire bumper structure with its supporting means be lowered so as to be located at the usual distance above the ground. To accomplish this the arms 1 are disposed below the frame bars B, as indicated in Figure 7, the plates 6 being inverted so that the holes 11 therein will be at the top of the frame bars so that certain of the J-bolts may be passed therethrough, the other J-bolts remaining in their accustomed places at the centers of the upright plates. With the arms in their lowered positions it is obvious that the plates 32 must be slid upwardly to a greater extent in order to engage and brace the fender irons but this is of course a detail which is easily accomplished owing to the slots 34 provided for adjustment purposes.

It is apparent that the bumper bar provides an excellent location on which the license plate for the car may be mounted and for this reason I have, in Figure 9, shown a T-shaped bracket 40 slotted at 41 for connection of a license plate therewith and having a shank 42 passing through any preferred point along the bumper bar 22 and secured as by a nut 43. This is, however, only an added refinement which may be omitted if desired.

In the use of the device it is quite evident that it will perform the functions of an ordinary bumper in protecting the car against injury as the result of minor collisions. Furthermore as the bumper itself is insulated from its supporting means there will be no danger to the occupants in case the bumper should ever touch a live wire, charged fence, or the like. It is quite clear that by removing the bolts 16 the bumper itself may be disconnected from its supports so as to permit unobstructed access to the radiator and other forward parts of the vehicle whenever such is necessary. Ample provision is made for all necessary adjustments which might be necessitated by various circumstances. It is believed that the construction, operation and advantages will be readily apparent to one skilled in the art without further explanation.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:—

1. In a device of the character described including arm members adapted to be mounted upon the frame of a vehicle, a bumper bar, and means for connecting the bumper bar with said supporting arms comprising bracket members detachably connected with said arms, plate members disposed against the bracket members, members of insulating material disposed against said plate members, metallic members seating against said insulating members, saddle members embracingly engaging the bumper bar and having bolt portions secured through and insulated from the brackets and plate members.

2. In a device of the character described including arm members adapted to be mounted upon the frame of a vehicle, a bumper bar, and means for connecting the bumper bar with said supporting arms comprising bracket members detachably connected with said arms, plate members disposed against the bracket members, members of insulating material disposed against said plate members, metallic members seating against said insulating members, saddle members embracingly engaging the bumper bar and having bolt portions secured through and insulated from the brackets and plate members, said insulating members being of ring formation, and filler blocks of insulating material located between the bumper bar and said metallic members and having reduced extensions fitting within the insulating members.

3. In a bumper attachment for vehicles, arm members, means for securing the same with respect to the frame of the vehicle, a bumper bar, bracket members carrying the bumper bar and detachably connected with said arms, and extension members connectible between the arms and said bracket members for advancing the bumper bar with respect to the vehicle.

4. In a bumper attachment for vehicles, a pair of supporting arms, bracket members detachably connected with said arms, saddle members carried by the brackets, a bumper bar conformingly seated within said saddle members, and securing members embracingly engaged about the bumper bar and passing through said bracket members.

5. In a device of the character described, a pair of supporting arms, a bumper structure carried by the arms, and means for mounting the arms upon the vehicle frame comprising upright plate members secured to the arms, and J-bolts passing through said upright members and engageable with the frame bars, said plate members being invertible and being provided with a plurality of holes through selected ones of which the J-bolts are engageable.

6. In a device of the character described, arm members adapted to be mounted upon the frame bars of a vehicle and carrying a bumper bar, and vertically slidably adjustable members mounted on the arms and engageable beneath the fender irons for bracing the same.

7. In combination with a bumper structure including supporting arms mounted upon the frame bars of a vehicle and carrying a bumper bar, fender bracing means comprising vertically adjustable members mounted upon said arms and engaging the fender irons.

8. In a device of the character described, arm members adapted to be mounted upon the frame bars of a vehicle and carrying a bumper bar, elongated vertically arranged plate members disposed against said arms, and means for securing said plate members to the arms in vertically adjusted position with their upper ends engaging the fender irons for bracing the same.

9. In a device of the character described, arm members adapted to be mounted upon the frame bars of a vehicle and carrying a bumper bar, elongated vertically arranged plate members disposed against said arms, and means for securing said plate members to the arms in vertically adjusted position with their upper ends engaging the fender irons for bracing the same, the fender irons having means thereon constituting abutments for the upper ends of the plate members.

10. In combination with a bumper structure including supporting arms adapted to be mounted upon the frame bars of a vehicle, fender bracing means comprising elongated plate members vertically arranged against said arms and each formed with a plurality of slots, and securing members passing through said slots and through the arms for maintaining said plate members in engagement with the fender irons.

In testimony whereof I affix my signature.

THOMAS F. BUCK.